Nov. 9, 1943.    P. MURPHY    2,333,947
SOLID TIRE CUSHION WHEEL
Filed Sept. 25, 1942    2 Sheets-Sheet 1

INVENTOR.
PETER MURPHY
BY
ATTORNEY.

Nov. 9, 1943.   P. MURPHY   2,333,947
SOLID TIRE CUSHION WHEEL
Filed Sept. 25, 1942   2 Sheets-Sheet 2

INVENTOR.
PETER MURPHY
BY
ATTORNEY.

Patented Nov. 9, 1943

2,333,947

UNITED STATES PATENT OFFICE 2,333,947

SOLID TIRE CUSHION WHEEL

Peter Murphy, New York, N. Y.

Application September 25, 1942, Serial No. 459,653

13 Claims. (Cl. 152—8)

This invention relates to new and useful improvements in a solid tire cushion wheel.

More particularly, the invention relates to a wheel, as mentioned, which has a plurality of segmental rim sections for supporting a tire, which also has a hub section, and which has a plurality of cylinders and pistons connected between said rim sections and hub section for movably connecting said sections. The invention proposes the provision of novel pneumatic cushioning means for said pistons and cylinders.

More particularly, the invention proposes to characterize the pneumatic cushioning means for each cylinder by an air chamber in the hub section which has a passage connected with the base wall of one of said cylinders, and a bellow-like member within said cylinder having an open end engaged over said passage and hermetically sealed, and a closed end abutting the inner end of the piston of said cylinder. With this construction the air within the air chamber and bellow-like members will act as a cushion for the tire. The pistons are capable of moving in and out in the cylinders without any danger of any of the air from the air chamber or bellow-like members escaping. There is no need for piston rings upon the pistons since the air never passes out of the bellow-like members.

The invention contemplates constructing these bellow-like members of rubber or metal. It is proposed that these members have accordion shaped walls which may expand and contract during the expansion and contraction of said members.

The invention further contemplates a novel construction for sealing the inner ends of the bellow-like members over the air passages at the bottom of the cylinders. Specifically, it is proposed to provide a tube which is set over each bellow-like member and which has its inner end clamping the open end of the bellow-like member hermetically over said passage, and which has its outer end adjacent the outer end of the cylinder. It is proposed to releasably hold said tubes in position so that the bellow-like members may be readily removed for repair or replacement when required.

Still further it is proposed that each bellow-like member have a flange upon its inner end upon which the inner end of the tube sets. It is merely necessary to hold the tube down, which in turn will hold the flange down to produce the hermetic seal stated.

Still further the invention contemplates a novel means for releasably holding each of said tubes in position.

The invention also contemplates reinforcing the outer ends of the bellow-like members by thickening these ends, or in other ways, so that they may easily withstand the pressure of the spokes during the operation of the wheel.

The invention also contemplates means for connecting the rim sections with each other so that the sections may expand radially but be held against relative lateral movements to stiffen and reinforce the wheel against stresses produced when the wheel strikes the side of the curb or other object.

More particularly, the invention proposes the provision of arcuate projections on the ends of the rim sections engaging arcuate recesses on adjacent ends of adjacent rim sections.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
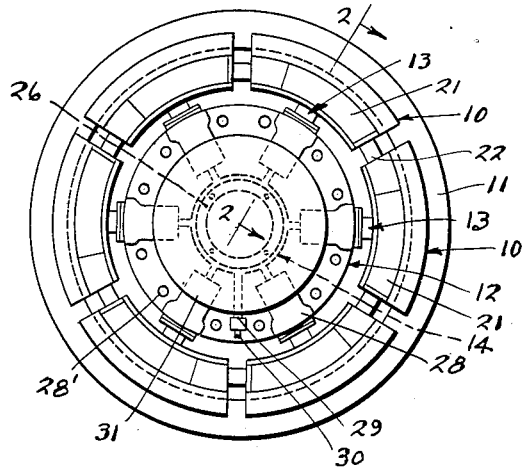
Fig. 1 is a side elevational view of a solid tire cushion wheel constructed in accordance with this invention.
Figure 2:
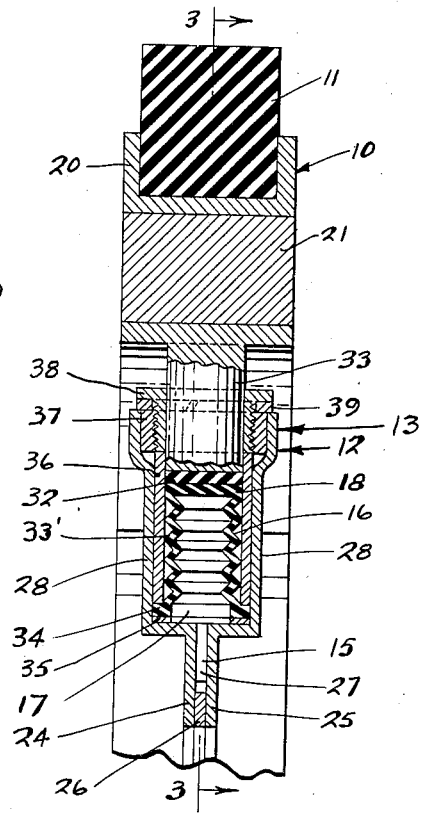
Fig. 2 is a fragmentary enlarged sectional view taken on the line 2—2 of Fig. 1 but illustrated with the hub cap removed.
Figure 4:
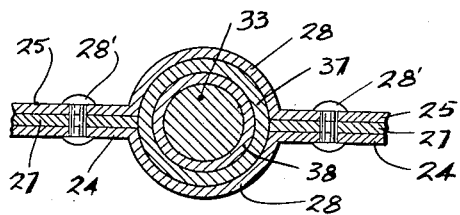
Fig. 4 is a fragmentary sectional view taken on the line 4—4 of Fig. 3.
Figure 3:
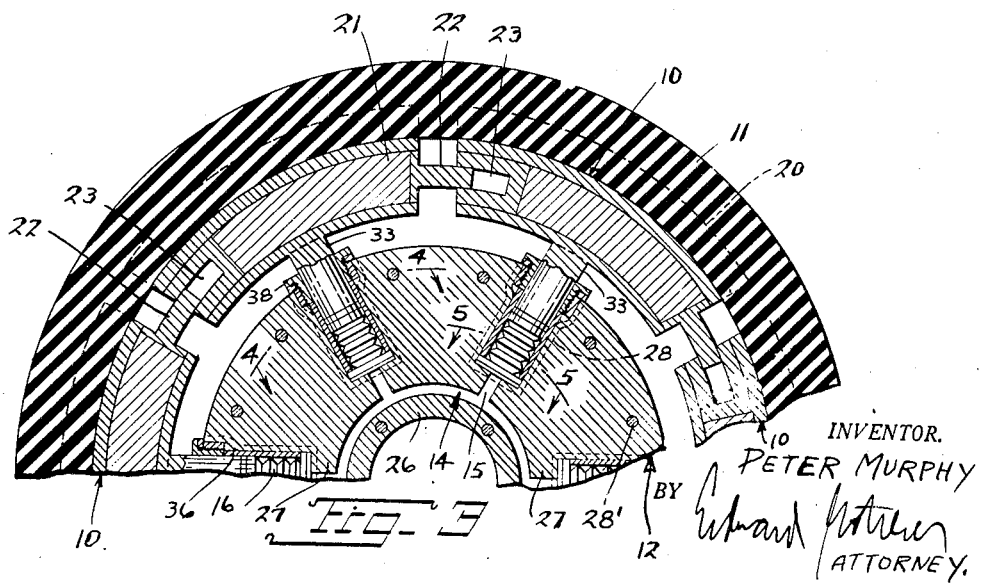
Fig. 3 is a transverse vertical sectional view taken on the line 3—3 of Fig. 2.
Figure 5:
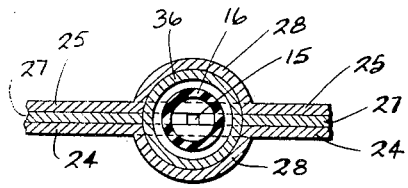
Fig. 5 is a fragmentary sectional view taken on the line 5—5 of Fig. 3.
Figure 6:
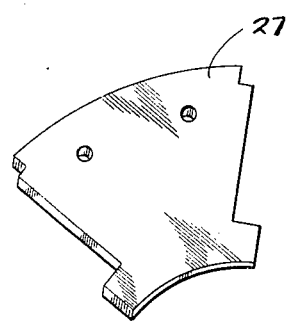
Fig. 6 is a perspective view of one of the segments in the hub of the wheel used to assist in forming the air chamber and passages.

The new improvements in a solid tire cushion wheel, in accordance with this invention, relates to a wheel having a plurality of segmental rim sections 10 for supporting a tire 11, and having a hub section 12, and furthermore having a plurality of cylinders and pistons 13 connected between said rim sections 10 and hub section 12 for movably connecting said sections. It is proposed to provide pneumatic cushioning means for each of said cylinders and pistons 13 and this new means is characterized by an air chamber 14 in said hub section 12 and having passages 15 connecting with the base walls of said cylinders, and furthermore by the provision of bellow-like members 16 within the cylinders and having open ends 17 engaged over said passages 15, and further having closed ends 18 abutting the inner ends of the pistons.

Each rim section 10 includes a flanged outer portion 20 into which the inner edge portion of the tire 11 sets. There is means for connecting the rim sections 10 with each other to reinforce the wheel against lateral and other stresses while at the same time not interfering with the radial expansion and contraction of the rim sections. This means is characterized by providing each rim section 10 with a body member 21 permanently attached to said flanged outer portion 20. Each body member 21 is provided with an arcuate projection 22 on one end engaging in an arcuate recess 23 on the adjacent end of an adjacent one of said rim sections. These arcuate projections 22 and complementary arcuate recesses 23 are disposed concentric with the hub section 12.

It is necessary that the arcuate projections 22 and arcuate recesses 23 have sufficient tolerances to permit the rim sections 10 to move radially inwards and outwards distances depending upon the design of the wheel, and particularly these tolerances should be sufficient so that the rim section, or rim sections at the bottom of the wheel during any instant of operation of the wheel, be capable of moving inwards while the remaining rim sections maintain their extended positions. However, laterally, the tolerances of the arcuate projections 22 and arcuate recesses 23 should be much smaller so that the rim sections reinforce each other and produce a sufficiently rigid unit which will resist lateral movements when the side of the wheel strikes the curb or other elevated object. Thus the rigid projections 22 will take many strains instead of requiring that the tire 11 take these strains.

The hub section 12 may be of various designs and constructions. However, a disc type of hub section has been disclosed on the drawings for illustrative purposes. It is composed of a pair of slightly spaced discs 24 and 25 which are held in relative positions by an annular member 26 and a plurality of arcuate segments 27 located between said discs. The discs 24 and 25, the annular member 26, and the segments 27 are held together in a permanent unit by rivets 28' between these parts. The segments 27 are slightly spaced from the annular member 26 to form the air chamber 14. The segments 27 are slightly spaced from each other to form the passages 15.

At certain points around the discs 24 and 25 the material of the discs is bellied outwards to form tubular portions 28 forming the bodies of the cylinders previously referred to. It is necessary that the air chamber 14 and passages 15 be capable of holding a suitable air pressure. For this reason it may be advisable to use gaskets between the latter referred to parts, or gasket cement, or a combination of gaskets and gasket cement, the idea being to prevent the leakage of air from the air chamber 14 and passages 15. Air may be supplied to this chamber 14 through a radial tube 29 which is provided at its outer end with a conventional inner tube valve 30. Fig. 1 shows a hub cap 31 mounted upon the central portion of the hub section 12.

Each bellow-like member 16 has a reinforced outer end 32 against which the inner end of a piston 33 engages. These pistons 33 comprise the pistons of the said cylinders and pistons 13. At their outer ends the pistons 33 are connected with the centers of the rim sections 10. The purpose of reinforcing or thickening the outer ends of the bellow-like members 16 is to make them strong to readily withstand the pressure of the pistons 33 during the operation of the wheel. The side walls of the bellow-like members 16 are formed with annular corrugations 33' facilitating the expansion and contraction of the bellow-like members. The inner ends of the bellow-like members 16 are formed with outwardly directed flanges 34. Beneath each flange 34 there is a shim 35 of annular form.

A tube 36 is set about each bellow-like member 16 and has its inner end engaging the flange 34 and clamping the open end of the bellow-like member hermetically over the said passage 15. The outer end of each tube 36 terminates adjacent the outer end of each cylinder of said cylinders and pistons 13. Means is provided for releasably holding said tubes 36 in positions. This means comprises an annular member 37 permanently set into the outer end of each tubular portion 28 forming the outer bodies of the cylinders. An annular gland 38 threadedly engages each annular member 37 and abuts the outer end of each tube 36. A lock washer 39 or other locking means is associated with the annular gland 38 for locking it from coming loose due to vibrations or other accidental means. It is pointed out that the annular members 38 may be tightly screwed down so as to force tubes 36 inwards so that the inner ends of the tubes tightly clamp the flanges 34 of the bellow-like member 16 to produce the hermetic seals already specified. The shims 35 are for the purpose of insuring a satisfactory clamping pressure upon the flanges 34.

The operation of the device is as follows:

When the air chamber 14 is deflated the rim sections 10 may be moved inwards and the tire 11 may be removed and replaced as desired. The wheel is inflated by supplying the valve 30 with compressed air. This compressed air will inflate the bellow-like members 16 which will force the pistons 33 outwards and thus extend the rim sections 10 which engage and firmly grip the tire 11. It is advisable that a sufficient quantity of air be supplied to the wheel so that the bottom piston 33 is in a predetermined desirable distance in its cylinder, but not a sufficient distance for the rim sections 10 to strike the annular glands 38. Thus the weight on the wheel is being supported by the bottom bellow-like member 16 and the adjacent bellow-like members 16. In this way the wheel will have a pneumatic cushion action.

Figure 8:
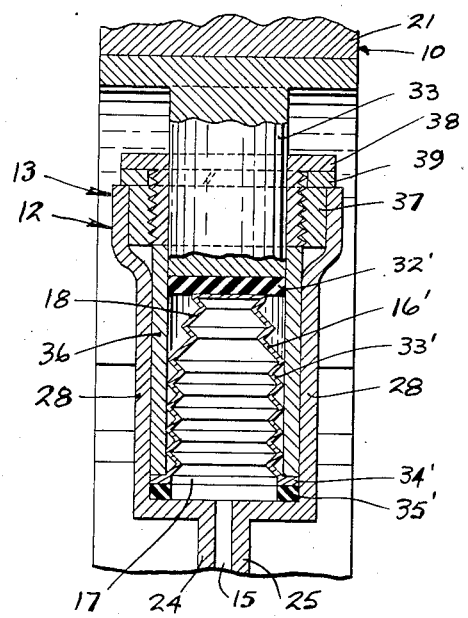
Fig. 8 is a fragmentary enlarged sectional view similar to a portion of Fig. 2 but illustrating a modified construction.
Figure 7:
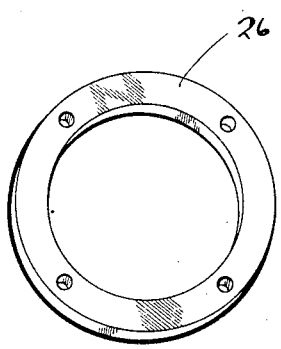
Fig. 7 is a perspective view of an annular member used in the hub of the wheel to assist in forming the air chamber and air passages.

In Fig. 8 a modified form of the invention has been disclosed which is very similar to the prior form, distinguishing merely in the fact that each bellow-like member 16' is formed from sheet metal. It is provided with a bottom flange 34' which rests upon a resilient shim 35'. The inner end of each piston 33 is provided with a resilient cushion or pad 32' which engages against the outer end of the bellow-like member 16'.

In other respects the construction and operation of this form of the invention is identical to the previous form and like parts are identified by like reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a solid tire cushion wheel having a plurality of segmental rim sections for supporting a tire, and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, and a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means cooperative with the outer end of said tube and releasably holding said tube in position.

2. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, and a bellow-like member within said cylinder having an open end engaged over said passage and a closed end abutting the inner end of the piston of said cylinder, said bellow-like member being of rubber and having a resilient flange around its open end, a tube set over said bellow-like member and having its inner end clamping said flange hermetically over said passage and having its outer end adjacent the outer end of said cylinder, and means cooperative with the outer end of said tube for releasably holding said tube in its clamping position.

3. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, and a bellow-like member within said cylinder having an open end engaged over said passage and a closed end abutting the inner end of the piston of said cylinder, said bellow-like member being of sheet metal and having a flange around its open end, a resilient shim beneath said flange, and a tube set over said bellow-like member and having its inner end clamping said flange hermetically over said passage and having its outer end adjacent the outer end of said cylinder, and means for releasably holding said tube in position.

4. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position.

5. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position, said bellow-like member having a bottom flange against which the inner end of said tube engages.

6. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position, the inner end of said bellow-like member having an outwardly directed bottom flange against which the inner end of said tube engages.

7. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position, the inner end of said bellow-like member having an outwardly directed bottom flange against which the inner end of said tube engages, and an annular shim beneath said flange.

8. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position, the side walls of said bellow-like member being corrugated.

9. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position, comprising an annular gland about said piston and threadedly mounted on an adjacent stationary part and abutting the outer end of said tube.

10. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position, comprising an annular member fixedly mounted in the outer end of said cylinder, and an annular gland threadedly engaging said annular member and abutting the outer end of said tube.

11. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open ends of said bellow-like member hermetically over said passage and having its outer end adjacent the outer end of said cylinder, and means for releasably holding said tube in position, comprising an annular member fixedly mounted in the outer end of said cylinder, and an annular gland threadedly engaging said annular member and abutting the outer end of said tube, and a lock washer clamped by said annular gland to hold the latter from working loose.

12. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, a bellow-like member within said cylinder having an open end engaged over said passage and a closed end abutting the inner end of the piston of said cylinder, a tube set over said bellow-like member and having its inner end clamping the open end of said bellow-like member hermetically over said passage and having its outer end adjacent the outer end of said cylinder, and means for releasably holding said tube in position, the outer end of said bellow-like member being reinforced to withstand the pressure of the piston.

13. In a solid tire cushion wheel having a plurality of segmental rim sections for supporting a tire and having a hub section, and a plurality of cylinders and pistons connected between said rim sections and hub section for movably connecting said sections, pneumatic cushioning means for each of said cylinders and pistons, comprising an air chamber in said hub section having a passage connecting with the base wall of one of said cylinders, and a bellow-like member within said cylinder having an open end engaged over said passage and a closed end abutting the inner end of the piston of said cylinder, said hub section comprising a pair of adjacent discs, spaced members between said discs to form said air chamber and passages, and said discs being provided with bellied out portions forming the outer walls of said cylinders.

PETER MURPHY.